M. W. SHIPP.
WATER GAGE.
APPLICATION FILED DEC. 13, 1913.
1,121,411.
Patented Dec. 15, 1914.
2 SHEETS—SHEET 1.
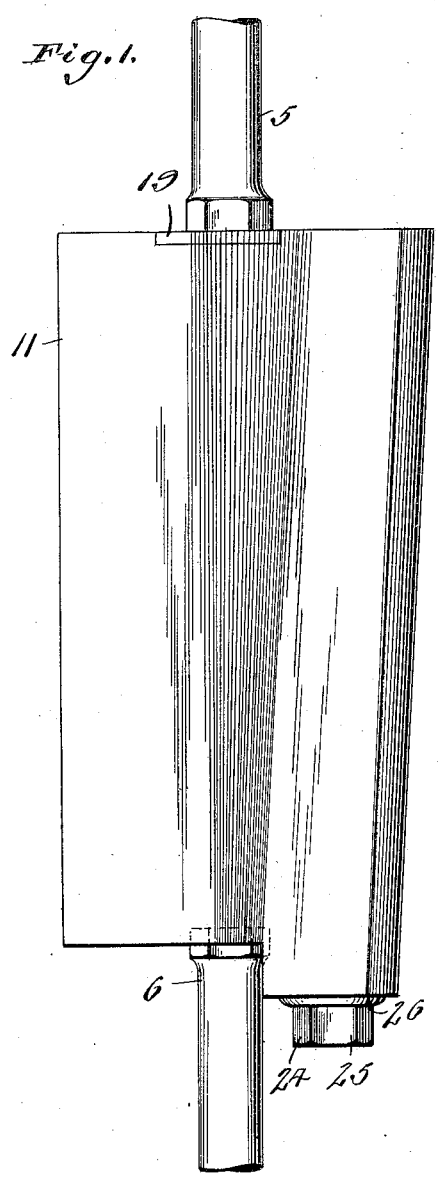
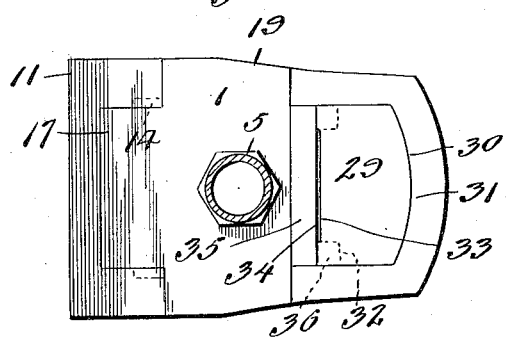
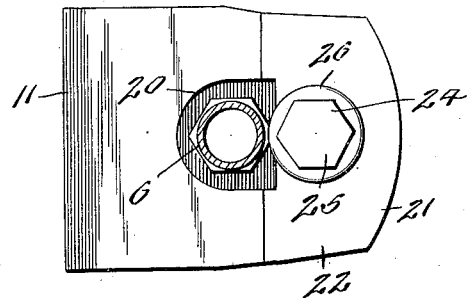
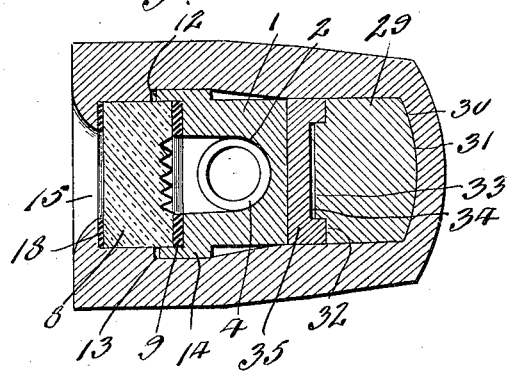
Inventor
M. W. Shipp,
By Victor J. Evans
Attorney
Witnesses

M. W. SHIPP.
WATER GAGE.
APPLICATION FILED DEC. 13, 1913.

1,121,411.

Patented Dec. 15, 1914.
2 SHEETS—SHEET 2.

Inventor
M. W. Shipp,

By Victor J. Evans
Attorney

Witnesses

UNITED STATES PATENT OFFICE.

MICHAEL W. SHIPP, OF WILKES-BARRE, PENNSYLVANIA.

WATER-GAGE.

1,121,411. Specification of Letters Patent. Patented Dec. 15, 1914.

Application filed December 13, 1913. Serial No. 806,575.

*To all whom it may concern:*

Be it known that I, MICHAEL W. SHIPP, a citizen of the United States, residing at Wilkes-Barre, in the county of Luzerne and State of Pennsylvania, have invented new and useful Improvements in Water-Gages, of which the following is a specification.

This invention relates to a water gage and in particular to the type of gage wherein the water glass is in the form of a plate or bar of sufficient thickness to withstand the pressure to which such a gage is ordinarily subjected. In a gage of this type, the water glass is usually clamped in position by means of a securing plate having clamping bolts connected therewith at spaced points. This construction is objectionable in that there will be portions of the glass which are not secured tight enough to the body of the gage and will be apt to yield to the pressure.

It is the purpose of my invention to provide a gage wherein the water glass is clamped in position by means of a wedge device which will bind the glass with uniform pressure throughout its entire area.

A further object of the invention is to provide a gage device of this character wherein the wedging device is constructed so that it will bind the glass effectively throughout its entire length even though the latter may be cut in its manufacture so as to be tapered slightly toward one of its ends.

Figure 4:
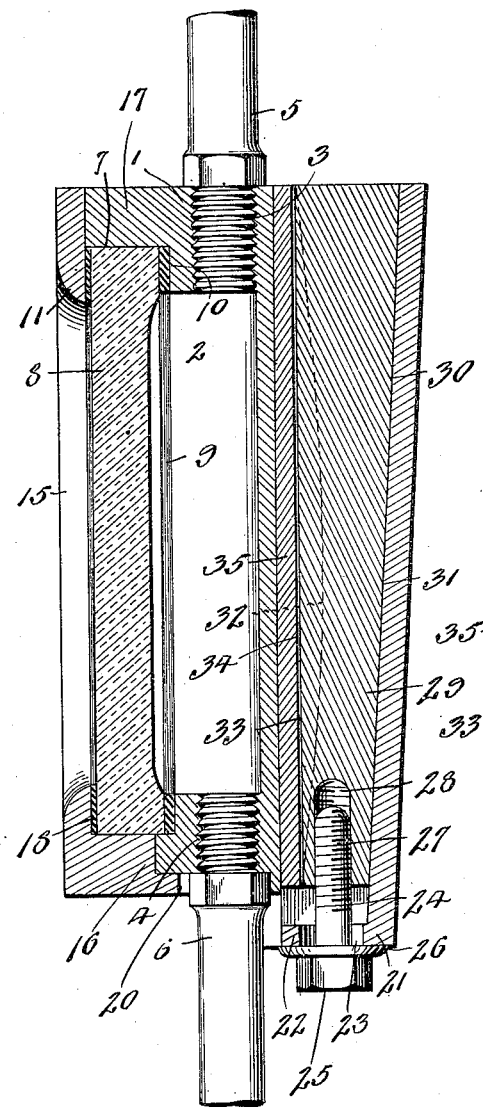
Figure 6:
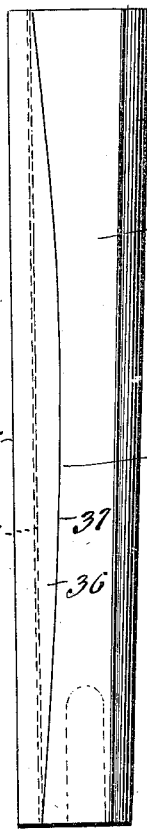
Figure 7:
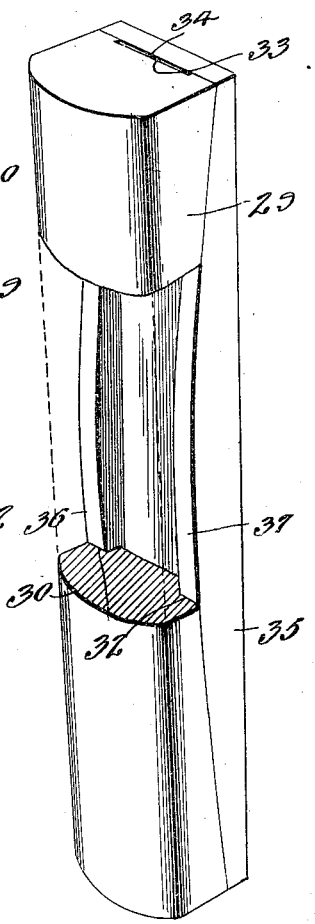

The invention consists in the features of construction, combination, and arrangement of parts, hereinafter fully described and claimed, reference being had to the accompanying drawings, in which:

Figure 1 is a side elevation of the gage in use; Fig. 2 is a top plan view of the same; Fig. 3 is a bottom plan view; Fig. 4 is a longitudinal sectional view taken therethrough; Fig. 5 is a transverse sectional view therethrough; Fig. 6 is a detail side elevation of the wedge device with its parts assembled; and, Fig. 7 is a perspective view of the same, the body portion of the wedge being broken away.

In the drawings, the numeral 1 designates the elongated rectangular body of the gage which is provided in its front face with a longitudinal groove 2 in communication with its alining terminal openings 3 and 4, the latter being threaded for connection with the pipes 5 and 6. The outer portion of the body groove is enlarged as at 7 to form a glass socket in which the water glass 8 is adapted to be positioned so as to project outwardly therefrom. A gasket 9 is mounted within the socket 7 against the marginal shoulder 10 between the latter and the glass. This gasket is constructed preferably of hard fiber.

The body 1 is adapted to be inclosed within a casing 11 with the marginal portion 12 of its front face slightly spaced from the ledge 13 formed in the sides of the casing. Securing flanges 14 are provided upon the upper end of the casing so as to extend inwardly adjacent to the ledges 15 for engagement within the upper end of the body 1, when the latter is positioned within the casing so as to hold the glass 8 in contact with the front wall of the casing. A longitudinal view opening 15 is provided in the said front wall of the casing so that the interior of the body groove 2 may be viewed through the glass. The lower end of the glass is supported by the head 16 provided at the lower end of the casing, and its upper end is secured by the enlargement 17 which is formed upon the upper end of the body 1. A gasket 18 of soft fiber is positioned between the front face of the glass and the front wall of the casing surrounding the view opening. Lateral flanges 19 are formed upon the upper end of the body 1 for engagement with the upper end of the casing. The pipe 6 which is secured to the lower end of the body 1 extends through an opening 20 provided in the casing head 16.

The lower end of the casing 11 is provided with an extension 21 in rear of the opening 20 whose head 22 is provided with an opening 23 for the reception of an adjusting screw 24. The operating head 25 of this screw is adapted to bear against a washer 26 positioned against the under face of the head 22. The inner threaded end portion 27 of the screw is adjustably engaged within the threaded longitudinal opening 28 provided in the lower end of a clamping wedge 29. The rear face 30 of the wedge 29 is transversely convex and is inclined forwardly and downwardly for engagement with the correspondingly spaced and inclined inner face 31 of the rear casing wall. The front face of the wedge is provided with longitudinal grooves 32 opening through its side faces and whose inner surfaces are longitudinally concave. The intervening portion 33 of the front face of the wedge is cut away to a slight extent, whereby the said face will be spaced slightly from the rear face 34 of a face plate 35, which is adapted to be positioned in front of the wedge with its longitudinal side flanges 36 engaged within the grooves 32 of the wedge. The outer bearing faces 37 of the flanges 36 are longitudinally convex and are curved concentric with the wedge grooves 32 so as to bear smoothly against the same and thus permit the face plate to be disposed angularly with respect to the wedge without spacing the flanges therefrom at any point, which would impair the sustaining and reinforcing function of the wedge.

When the parts of the gage are assembled, the face plate 35 of the wedge device will fit snugly against the rear face of the body 1 even though the same may be inclined with respect to the longitudinal axis of the casing, due to inequalities in the construction of the water glass or the gaskets employed in connection therewith. The glass or gaskets may be tapered longitudinally without affecting the even engagement of the face plate of the wedge device with the body 1, owing to the pivotal mounting of the face plate upon the wedge body. As the wedge is drawn downwardly by operation of the adjusting screw 24, the face plate will continue to bear against the body 1 evenly throughout its area, and the water glass consequently will be clamped in position and reinforced effectively throughout its marginal area. There can be no danger of breakage when the glass is sustained in this uniformly effective manner.

What is claimed is:

1. A gage of the class described comprising an elongated body having a groove in one of its longitudinal faces and terminal pipe openings communicating therewith, a casing surrounding the said body and provided with a view opening in its front wall, a water glass positioned within the casing between the front wall of the same and the said body so as to close the body groove and the view opening of the casing, the inner face of the rear casing wall being inclined longitudinally, an elongated clamping wedge mounted within the casing in engagement with the rear wall of the same and disposed longitudinally with respect to the said body, the said wedge being provided in its front face with a recess having a concave inner face, a face plate positioned between the front face of the wedge and the rear face of the said body, and a flange provided upon the rear face of the said face plate and having a convex surface for engagement within the flange recess.

2. A gage of the class described comprising an elongated body having a groove in one of its longitudinal faces and terminal pipe openings communicating therewith, a casing surrounding the said body and provided with a view opening in its front wall, a water glass positioned within the casing between the front wall of the same and the said body so as to close the body groove and the view opening of the casing, the inner face of the rear casing wall being inclined longitudinally, an elongated clamping wedge mounted within the casing in engagement with the rear wall of the same and disposed longitudinally with respect to the said body, the said wedge being provided in its front face with a recess having a concave inner face, a face plate positioned between the front face of the wedge and the rear face of the said body, and a flange provided upon the rear face of the said face plate and having a convex surface for engagement within the flange recess, the said flange face being curved concentric with the inner face of the wedge recess.

3. A gage of the class described comprising an elongated body having a groove in one of its longitudinal faces and terminal pipe openings communicating therewith, a casing surrounding the said body and provided with a view opening in its front wall, a water glass positioned within the casing between the front wall of the same and the said body so as to close the body groove and the view opening of the casing, the inner face of the rear casing wall being inclined longitudinally, an elongated clamping wedge mounted within the casing in engagement with the rear wall of the same and disposed longitudinally with respect to the said body, the said wedge being provided in its front face with a recess having a concave inner face, a face plate positioned between the front face of the wedge and the rear face of the said body, and a flange provided upon the rear face of the said face plate and having a convex surface for engagement within the flange recess, the said flange face being curved concentric with the inner face of the wedge recess, the face plate flange being constructed of such width that the adjacent faces of the face plate and wedge are normally spaced.

4. A gage of the class described comprising an elongated body having a groove in one of its longitudinal faces and terminal pipe openings communicating therewith, a casing surrounding the said body and provided with a view opening in its front wall, a water glass positioned within the casing between the front wall of the same and the said body so as to close the body groove and the view opening of the casing, the inner face of the rear casing wall being inclined longitudinally, a clamping wedge movably mounted within the casing between the rear wall thereof and the said body, the said casing having a head formed at the end thereof adjacent to the smaller end of the wedge with a head having an opening disposed in alinement with the wedge, the said wedge being provided in its smaller end with a threaded longitudinal opening, and an adjusting screw engaged within the wedge opening and rotatably mounted within the opening of the casing head, the operating head of the screw being adapted for engagement with the outer face of the casing head.

MICHAEL W. SHIPP.

Witnesses:
E. RAY SUTTON,
JOHN P. POLLOCK.

Copies of this patent may be obtained for five cents each, by addressing the "Commissioner of Patents, Washington, D. C."